United States Patent [19]

Idesawa

[11] Patent Number: 4,586,589
[45] Date of Patent: * May 6, 1986

[54] AUTOMATIC BRAKING GAP ADJUSTOR SYSTEM FOR MECHANICAL TYPE DRUM BRAKE

[75] Inventor: Isao Idesawa, Nagano, Japan

[73] Assignee: Nisshin Kogyo Kabushiki Kaisha, Japan

[*] Notice: The portion of the term of this patent subsequent to Jan. 22, 2002 has been disclaimed.

[21] Appl. No.: 526,328

[22] Filed: Aug. 25, 1983

[30] Foreign Application Priority Data

Aug. 31, 1982 [JP] Japan .............................. 57-131701[U]
Aug. 31, 1982 [JP] Japan .............................. 57-131702[U]
Aug. 31, 1982 [JP] Japan .............................. 57-131703[U]
Apr. 7, 1983 [JP] Japan .............................. 58-51690[U]

[51] Int. Cl.[4] ............................................. F16D 65/60
[52] U.S. Cl. ........................... 188/79.5 K; 188/196 BA
[58] Field of Search .................. 188/79.5 GC, 79.5 K, 188/79.5 GE, 196 BA, 71.8, 200, 329

[56] References Cited

U.S. PATENT DOCUMENTS

| | | | |
|---|---|---|---|
| 2,379,796 | 7/1945 | Freeman et al. | 188/196 BA |
| 3,129,789 | 4/1964 | Hodkinson | 188/196 BA X |
| 3,851,737 | 12/1974 | Hewins | 188/196 BA X |
| 3,926,284 | 12/1975 | Notario | 188/196 BA |
| 4,394,892 | 7/1983 | Mizusawa et al. | 188/79.5 K |
| 4,494,633 | 1/1985 | Idesawa | 188/196 BA X |

FOREIGN PATENT DOCUMENTS

| | | | |
|---|---|---|---|
| 0028491 | 5/1907 | Austria | 188/196 BA |
| 0028382 | of 1972 | Japan | 188/196 BA |
| 0186645 | 9/1922 | United Kingdom | 188/196 BA |
| 2074671 | 11/1981 | United Kingdom | 188/196 BA |

Primary Examiner—Bruce H. Stoner, Jr.
Assistant Examiner—Michael P. Gilday
Attorney, Agent, or Firm—Wegner & Bretschneider

[57] ABSTRACT

An automatic braking gap adjustor system for mechanical type drum brakes, including a cam member for expanding brake shoes by turning of a brake arm, a cam collar axially slidingly fitted into the cam member, the cam collar abutting onto the free ends of shoe webs, an adjusting bolt axially and threadedly inserted through the cam member to move the cam collar, an adjusting gear disposed so as to be rotatable in unison with the adjusting bolt, and a stopper lever engaged with the adjusting gear in such a manner that the gear is kept from turning in the actuation direction of the cam member, whereby, when the abrasion of the linings reaches a predetermined value, the adjusting lever is engaged in another place with the adjusting gear for adjustment, and further a support pin extending parallel to the cam member, to which is attached the stopper lever in such a manner that it is movable in the actuation direction of the cam member, and a spring member whereby the stopper lever is biased in the counter-actuation direction of the cam member.

5 Claims, 13 Drawing Figures

4,586,589

AUTOMATIC BRAKING GAP ADJUSTOR SYSTEM FOR MECHANICAL TYPE DRUM BRAKE

FIELD OF THE INVENTION

The present invention relates to an automatic braking gap adjustor system for mechanical type drum brakes, which includes a cam member for expanding brake shoes by turning of a brake arm, a cam collar axially slidable abutting onto the free ends of shoe webs, and an adjusting bolt threadedly inserted through the cam member in the axial direction, said adjusting bolt adapted to move threadedly to cause axial movement of the cam collar and movement of the brake shoes in their expansion direction, thereby to expand the shoes.

BACKGROUND OF THE INVENTION

Such a braking gap adjustor system includes an adjusting mechanism wherein an adjusting gear is engaged at its shank portion with the end of the adjusting bolt axially inserted through the cam member in such a manner that it is axially slidable and rotatable in unison with the adjusting bolt. When linings wear away, the adjusting gear, which is kept from turning in the actuation direction of the cam member by a stopper lever, is engaged in another place with the adjusting lever, which turns with the cam member in the actuation direction thereof. As a result, threaded movement of the adjusting bolt takes place, thereby to cause the cam collar to move in the axial direction and the expansion direction of the brake shoes, so that the brake shoes move away from each other for the adjustment of the braking gap.

With such an adjusting mechanism, when a load exceeding a predetermined value is applied to the stopper lever in the actuation direction, there is a variation in the position at which the adjusting lever mates with the adjusting gear, which may cause over-adjustment. Furthermore, when the stopper lever receives an overload after full-adjustment, it may possibly fail or break.

SUMMARY OF THE INVENTION

A main object of the present invention is therefore to provide an improved braking gap adjustor system for mechanical type drum brakes, which is substantially free from the drawbacks of the prior art.

According to the first aspect of the present invention, there is provided an automatic braking gap adjustor system for mechanical type drum brakes, including a cam member for expanding brake shoes by turning of a brake arm, a cam collar axially slidingly fitted into said cam member, said cam collar abutting onto the free ends of shoe webs, an adjusting bolt axially and threadedly inserted through said cam member to move said cam collar, an adjusting gear disposed so as to be rotatable in unison with said adjusting bolt, and a stopper lever engaged with said adjusting gear in such a manner that it is kept from turning in the actuation direction of said cam member, whereby, when the abrasion of linings reaches a predetermined value, said adjusting lever is engaged in another place with said adjusting gear for adjustment, and further including a support pin extending vertically from a stationary body, to which is attached said stopper lever in such a manner that it is movable in the actuation direction of said cam member, and a spring member whereby said stopper lever is biased in the counter-actuation direction of said cam member.

According to the second aspect of the present invention, there is provided an automatic braking gap adjustor system of the aforesaid type, in which said stopper lever includes a pivotal end having therein an opening of a given shape to receive said support pin, and in which said stopper lever is slidable over stopper means provided on said stationary body, and biased in the counter-actuation direction of said cam member by said spring member, whereby, when the amount of movement of said stopper lever in the actuation direction of said cam member reaches a predetermined value, said stopper lever is held in another place by said stopper means to disengage said stopper lever out of said adjusting gear.

According to the third embodiment of the present invention, there is provided an automatic braking gap adjustor system of the aforesaid type, in which said stopper lever includes a pawl portion with which said adjusting gear is engaged, an engaging pawl portion which is contiguous to a wall of a casing outward of said pawl portion and an opening portion to receive the shank portion of said cam member, said opening portion including a section to be in sliding engagement with said shank portion and an essentially sector-shaped space which is sufficient for allowing said shank portion to turn around the end of said engaging pawl portion, and in which said stopper lever abuts at its sliding engaging section onto said shank portion, and is biased in the counter actuation direction of said cam member by an engaging pin extending vertically from said wall, whereby, when the amount of movement of said stopper lever reaches a predetermined value, said engaging pawl portion engages within a recess formed in said wall, so that said stopper lever turns therearound, thereby to disengage said stopper lever out of said adjusting gear.

BRIEF DESCRIPTION OF THE DRAWINGS

The above-mentioned and other objects and features of the present invention will become apparent from the following detailed description with reference to the accompanying drawings, in which:

FIG. 2 a rear view, FIG. 3 a sectional view taken along the line III—III of FIG. 2; FIG. 4 a plan view; FIG. 5 a sectional view showing the stopper lever held in place; and FIG. 6 an exploded perspective view showing the stopper lever and the spring member.

FIG. 8 a sectional view showing the stopper lever before locking; FIG. 9 a front view showing the stopper lever locked in place; and FIG. 10 a sectional view showing the stopper lever locked in place.

FIG. 12 a front view showing the stopper lever during operation; and FIG. 13 a partialy sectional view of FIG. 12.

DETAILED DESCRIPTION OF THE INVENTION

Figure 1:
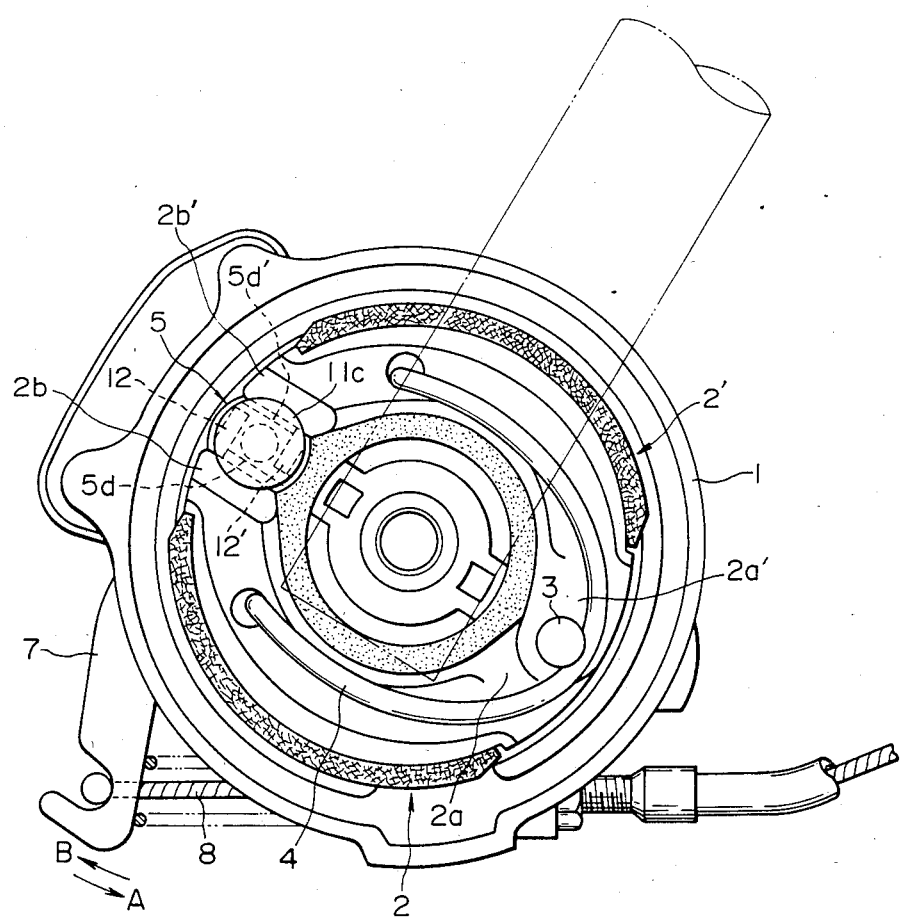
FIGS. 1 to 6 inclusive show an embodiment of the present invention applied to a motor bicycle, FIG. 1 being a front view.

Referring now to FIGS. 1 to 6 inclusive which show the present invention applied to a motor bicycle, a back plate 1 is provided on its inside with a pair of brake shoes 2 and 2' with their one ends 2a and 2a' being pivotally supported on an anchoring pin 3. The brake shoes 2 and 2' are biased by a shoe return spring 4 in such a manner that they are constantly movable toward each other. Between the shoe web free ends 2b and 2b' of the brake shoes 2 and 2', there is a cam member 5 extending through the back plate 1 via a washer 6. The cam portion 5a of the cam member 5 faces both web free ends 2b and 2b', while the shank 5b thereof is rotatably mounted on the back plate 1. A brake arm 7 is fixed to the serrated portion 5c of the cam member 5 extending outward of the back plate 1, and rotatable by a brake-operating wire 8 to rotate the cam member 5.

Cam collar grooves 9 and 9' recede from the rear end of the cam portion 5a of the cam member 5 and terminate at the front end thereof. The grooves are symmetrically positioned at right angles with the faces 5d and 5d' with an adjusting bolt-inserting opening 10 therebetween.

An adjusting bolt 11 is inserted at its shank portion 11a through the opening 10, and held in place with the externally threaded end portion 11b of the shank being in threaded engagement with the cam member 5 and the head portion 11c taking abutment onto a pair of cam collars 12 and 12' fitted into the cam collar grooves 9 and 9', by way of a washer 13. An adjusting gear 14 is inserted at its shank portion 14a through the cam member 5. The flat end portion 14b of the shank 14a engages within aslit 11d formed in the adjusting bolt 11, so that the adjusting bolt 11 rotates and moves threadedly in unison with the rotation of the adjusting gear 14.

The cam collars 12 and 12' are formed of plates of a right-angled triangular form with the slopes abutting upon the tapered bottoms of the cam collar grooves 9 and 9' and the vertical places abutting onto the shoe web free ends 2b and 2b'. Thereby, the collars 12 and 12' rotate in unison with the cam member 5 and move axially to expand the brake shoes 2 and 2' away from each other.

The back plate 1 is provided on its outside with a partition 15 having a covering 15a, which covers the mount portion of a brake arm 7. The cam shaft 5e of the cam member 5 extends from the middle portion of the partition 15 through a sealing member 16.

A dust cover 17 covers the upper portion of the partition 15 through a sealing member 18, partly fits into an axle boss 19, and is fixedly screwed into an internally threaded boss portion 1a in the back plate 1 by means of three bolts 20 inserted through the partition 15.

A stopper lever 21 includes a pivotal end 21a elongately slotted at 21b in the rotational direction of the adjusting gear 14. A resilient pawl portion 21c rises and extends from the end portion of the pivotal end 21a. A support pin 22 is inserted into the elongate slot 21b, and fixedly screwed into the boss portion 15b in the stationary partition 15. A C-shaped clip 23 is then provided to prevent disengagement of the pin 22. A spring member 24 is provided with its one end hook portion being locked to a projection 25 vertically from the partition 15 and its other end hook portion being locked to the stopper lever 21.

In this manner, the stopper lever 21 is constantly biased to hold the brake arm 7 in place. The hook-engaging projection 25 abuts at its end against the inner wall of the dust cover 17 to prevent disengagement of the hook portions of the spring member 24. When the brake arm 7 is pulled in an actuation direction indicated by A in FIG. 2, the stopper lever 21 mates at the end of the resilient pawl portion 21c with a tooth 14c of the adjusting gear 14, so that the adjusting gear 14 is kept from rotating in the actuation direction of the cam member, but allowed to rotate in the counter-actuation direction.

An adjusting lever 26 is tightly fitted over the shank portion 5e of the cam member 5, so that it is rotatable in unison with the cam member 5. The adjusting lever 26 includes a resilient pawl portion 26a adapted to mate with a tooth 14c of the adjusting gear 14.

The foregoing emebodiment operates as follows.

Figure 2:
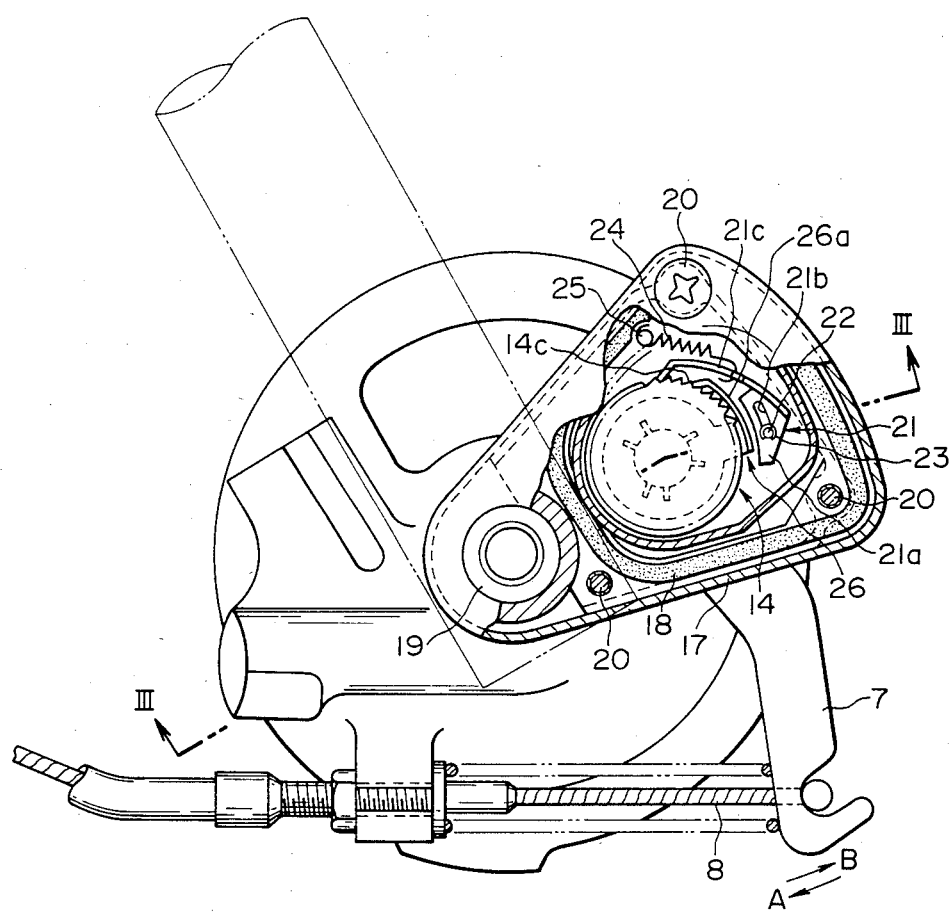
Figure 3:
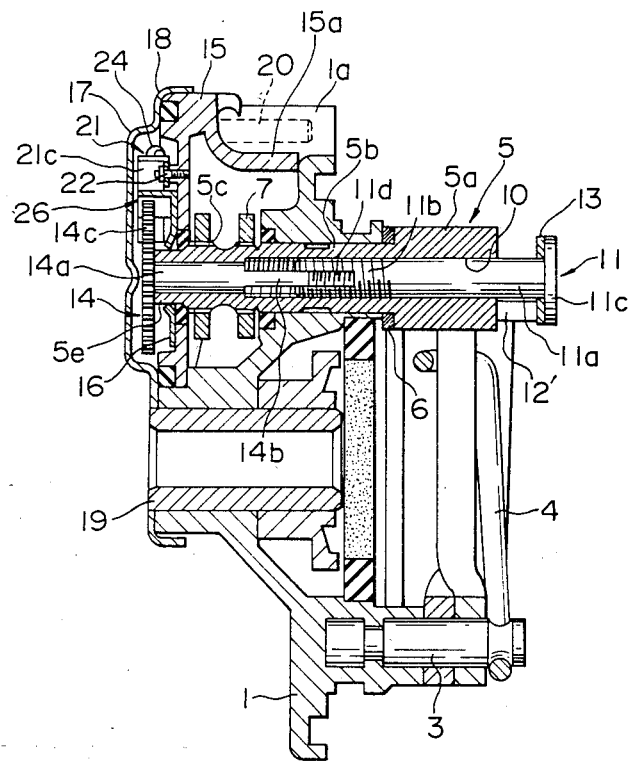
Figure 4:
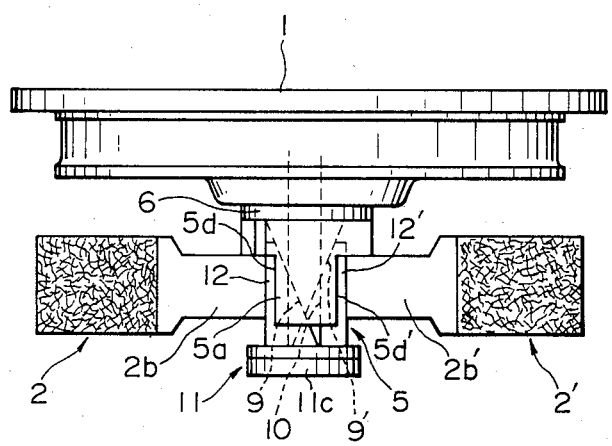
Figure 5:
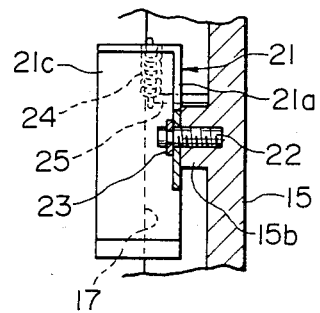
Figure 6:
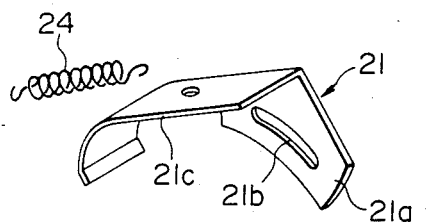

Manipulation of the brake lever or pedal, as shown in FIGS. 1 and 2, causes the brake arm 7 to rotate in the direction indicated by A. The cam member 5 then rotates in association with the pivotal movement of the brake arm 7, in a counter-clockwise direction, as shown in FIG. 1, and the cam portion 5a forces open the brake shoes 2 and 2', whereby they are expanded against the action of the shoe return spring 4 to engage the linings with the inner face of a brake drum (not shown) for braking.

In association with the pivotal movement of the brake arm 7, the cam member 5, the cam collars 12 and 12', the adjusting gear 14 and the adjusting bolt 11 rotate together within such an angular range that the resilient pawl 26a of the adjusting lever 26 slides over the slope of the same tooth 14c of the adjusting gear 14.

The linings will, wear away due to braking. However, when the braking gap exceeds a predetermined value, the cam member 5, the cam collars 12 and 12' and the adjusting lever 26 rotate relative to an increase in the braking gap, since, during braking, the adjusting gear 14 is kept from rotating by the resilient pawl portion 21c of the stopper lever 21. Thereupon, the resilient pawl portion 26a of the adjusting lever 26 moves over one tooth of the adjusting gear 14 and mates with the next tooth 14c, and the adjusting bolt 11 threadedly moves through the cam member 5 in the lefthand direction in FIG. 3, so that the cam collars 12 and 12' are moved toward the back plate 1 by the head portion 11c of the adjusting bolt 11. By this, the cam collars 12 and 12' move slidably along cam collar grooves 9, 9' in an axial direction and project in an expanding direction of shoe from cam portion 5a, thereby pushing web free ends 2b, 2b' wide to adjust the braking gap.

Release of braking causes the brake arm 7, the cam member 5, the cam collars 12 and 12', the adjusting gear 14 and the adjusting bolt 11 to turn together in a direction indicated by B in FIGS. 1 and 2. Since the adjusting lever 26 then ensures that the adjusting gear 14 turns in unison with the cam member 5, the resilient pawl portion 21c of the stopper lever 21 moves over the associated tooth and mates with the next tooth 14C until adjustment is completed. In this manner, the resilient pawl portions 21c and 26a of the stopper lever 21 and the adjusting lever 26 mate successively with the tooth 14c of the adjusting gear 14 to extend the cam collars 12 and 12' in the shoes expansion direction, whereby the braking gap is constantly adjusted to a constant value.

When an overload is applied to the brake arm 7 to such an extent that there is a change in the rigidity of the drum during adjustment, the stopper lever 21 turns in the actuation direction of the cam member together with the cam member 5, the adjusting lever 26 and the adjusting gear 14. That is, the stopper lever 21 is constantly biased by the spring member 24 in the counter-actuation direction of the cam member, but it moves in the actuation direction of the cam member 5 which is identical with the direction of the brake arm 7, since the elongate slot 21b is guided by the support 22 in the actuation direction of the cam member 5. Thus, the engagement of the adjusting gear 14 with the resilient pawl portions 21c and 26a of the stopper lever 21 and the adjusting lever 26 is maintained. Consequently, even when an overload is applied to the brake arm 7, the adjusting gear 14 is kept from being turned by the adjusting lever 26 in the actuation direction of the cam member, i.e., in the adjusting direction. In this way, any over-adjustment is prevented without causing dragging of the linings.

After the abrasion of the lining has reached a critical value, any adjustment is no longer effected with respect to the linings, so that there is an increase in the stroke of the brake lever or pedal, which is a sign that the brake shoes 2 and 2' need replacement. During such full-adjustment, the adjusting gear 14 together with the adjusting bolt 11 turns in unison with the cam member 5 in the actuation direction of the brake arm 7; however, since the stopper lever 21 turns in unison therewith and slides along stopper support 22, no failure or breakage of the lever 21 takes place.

According to the embodiment as described above, when an overload is applied to the brake arm to such an extent that the rigidity of the drum is varied due to hard braking, the stopper lever is guided by the support pin, said lever being designed to prevent the adjusting gear from turning simultaneously with the cam member, and moved simultaneously with the adjusting gear and slides along support 22 against the action of the spring member designed to hold it in place in the actuation direction of the cam member, i.e., in the adjusting direction. Thus, adjustment does not proceed any more to prevent over-adjustment from taking place, since the engagement of the adjusting gear with the adjusting lever is then maintained. In addition, although the adjusting gear turns in unison with the cam member during full-adjustment, the stopper lever slides in the rotational direction of the cam member without causing a variation in the engagement of the adjusting gear with the adjusting lever. Accordingly, no failure or breakage of the stopper lever 21 takes place, since no overload is applied thereto.

Another embodiment of the present invention will now be explained with reference to FIGS. 7 to 10 inclusive. A stopper lever 121 includes a pivotal end 121a, in the middle portion of which is formed an opening 122 of a given shape. A rising piece 121b is provided to the end of the pivotal end 121a. A stopper pin 124 provided to a stationary partition 115 through a stopper means 123 is inserted into the opening 122 in the stopper lever 121. The stopper lever 121 is thus positioned in place in such a manner that it is slidable over the stopper means 123, and constantly biased in the counter-actuation direction of a cam member by a spring member 125 locked to the rising piece 121b. The stopper lever 121 includes a resilient pawl portion 121c which mates at its end with one tooth 114c of an adjusting gear 114 in such a manner that, when the brake arm is pulled in the actuation direction, the adjusting gear 114 is restrained from turning in the actuation direction of the cam member, but allowed to turn in the counter-actuation direction.

Figure 7:
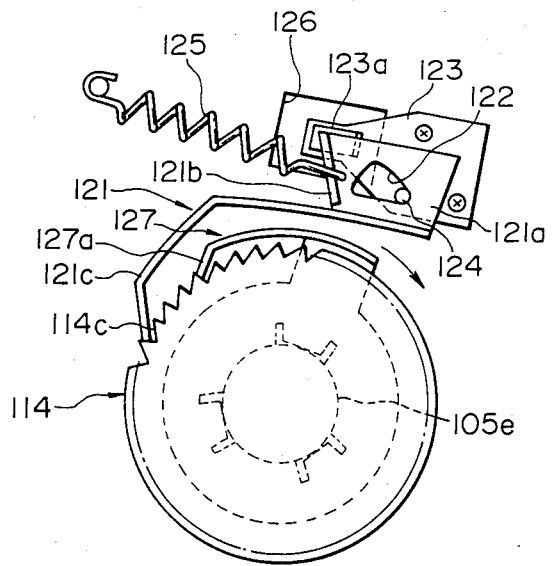
FIGS. 7 to 10 inclusive show another embodiment of the present invention, FIG. 7 being a front view showing the stopper lever full-adjusted before locking.
Figure 8:
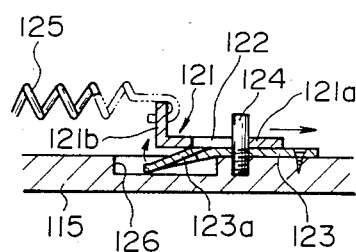
Figure 9:
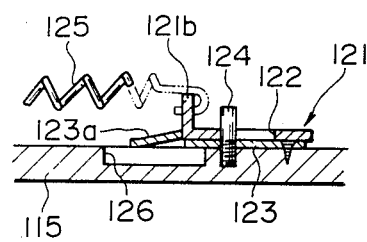
Figure 10:
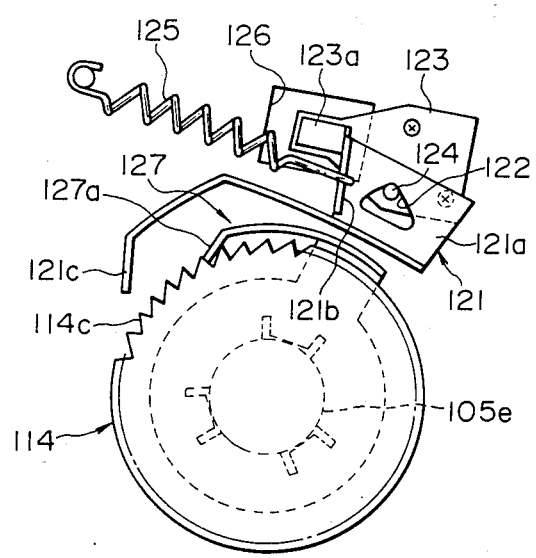

In this state, as shown in FIGS. 7 and 10, the stopper lever 121 is positioned on a bent piece 123a of the stopper means 123, and the support pin 124 abuts against the end of the opening 122 lying in the actuation direction of the cam member. The bent strip 123a is pushed by the stopper lever 121, and positioned in a recess formed in the partition 115. After full-adjustment, the stopper lever 121 turns together with the adjusting gear 114 around the support pin 124 in the actuation direction of the cam member against the action of the spring member 125. When wearing reaches a predetermined value, the rising piece 121b of the lever 121 goes over the upper face of the bent piece 123a of the stopper means 123. The bent piece 123a is then lifted up under the action of its own spring force, as shown in FIGS. 9 and 10, and engages with the rising piece 121b. As a result, even when the brake arm returns to the original position, the stopper lever 121 does not return to the original position, but is held in another position so that the resilient pawl portion 121c of the stopper lever 121 disengages the tooth 114c of the adjusting gear 114.

An adjusting lever 127 engages the shank portion 105e of the cam member and is held in place in such a manner that it is rotatable in unison with the cam member, and includes on its outside a resilient pawl portion 127a, which mates with the tooth 114c of the adjusting gear 114 from the outside.

The second embodiment operates as follows.

When the abrasion of the linings reaches a critical value, the stopper lever 121 is constantly biased in the counter-actuation direction of the cam member by the spring member 125, but adjustment is interrupted so that the amount of rotation of the adjusting gear 114 increases, thereby causing the stopper lever 121 to slide over the stopper means 123 while it continues to engage the tooth 114c of the adjusting gear 114. Thus, the stopper lever 121 moves together with the adjusting gear 114 in the actuation direction of the cam member. That is, by the time a given value is reached, the stopper lever 121 reciprocates slidingly over the stopper means 123 against the action of the spring member 125, so that the resilient pawl portion 127a of the adjusting lever 127 does not go over the associated tooth 114c of the adjusting gear 114. Thus, no adjustment takes place.

When a predetermined value is reached with respect to abrasion, there is an increase in the amount of movement of the stopper lever 121 in the actuation direction of the cam member, which causes the rising piece 121b of the lever 121 to go over the upper face of the bent piece 123a of the stopper means 123. At this time, the bent piece 123a is lifted out of the recess 126 in the partition 115 by its own spring force, and engages the rising piece 121b. Accordingly, even when the brake arm returns to the original position, the stopper lever 121 does not return to the original position, it disengages the adjusting gear 114, and is held in place as shown in FIG. 10.

After full-adjustment, the stopper lever 121 permits the adjusting gear 114 to rotate in the actuation direction of the cam member to prevent any failure or breakage thereof. Since adjustment does not proceed any more, there is an increase in the stroke of the brake lever or pedal, which is a sign that the brake shoes need replacement.

When an overload is applied to the brake arm to such an extent that there is a change in the rigidity of the drum during adjustment, the stopper lever 121 moves together with the adjusting gear 114, against the action of the spring member 125 without causing a variation in the engagement of the adjusting gear 114 with the adjusting lever 127, whereby adjustment is interrupted. Thus, any over-adjustment is effectively avoided.

According to the second embodiment as described above, after full-adjustment, the stopper lever moves slidingly over the stopper means in the actuation direction of the cam member while it engages the adjusting gear. When a given value is reached with respect to abrasion, the stopper lever is held in another place, whereby the stopper lever disengages the adjusting gear. Thus, after full-adjustment, the stopper lever allows the adjusting gear to turn in the actuation direction of the cam member. As a result, no load is applied to the stopper lever thereby avoiding any failure or breakage thereof for re-use.

A further embodiment of the present invention will now be explained with reference to FIGS. 11 to 13.

According to this embodiment, a stopper lever 223 includes a pivotal end which is opened at 224 to receive a shank portion 205f of a cam member extending from a casing 217, and has an extending pawl portion 223a that is to engage a tooth 214c of an adjusting gear 214 and an extending pawl portion 223b that is to engage the wall of 217b of the casing at a position outward of the pawl portion 223a.

The changed portion 224 includes an arcuate wall 224a that is to abut onto part of the outer periphery of the shank portion 205f running from $P_1$ to $P_2$ and an opposite arcuate wall 224b that is to receive the shank portion of the cam member. Space 224 is essentially sector-shaped with the apex 224a being arcuate. As best seen from FIG. 12, the points $P_1$ and $P_2$ are positioned on the lefthand side between arcs $L_1$ and $L_2$ which are concentric and in relation to circles having radii $R_1$ and $R_2$, the center of which is located at an end point a of the pawl portion 223b, so that the edges 224d and 224c of the essentially sector-shaped space 224 are contiguous to the points $P_1$ and $P_2$ and extend inward or outward of the arcs $L_1$ and $L_2$.

The stopper lever 223 is held in place by allowing its side 223c to abut against a pin 225 extending vertically from the casing 217, and biased in the counter-actuation direction of the cam member by a spring 227 with its one end being locked to a support pin 226 extending vertically from the casing 217.

Figure 11:
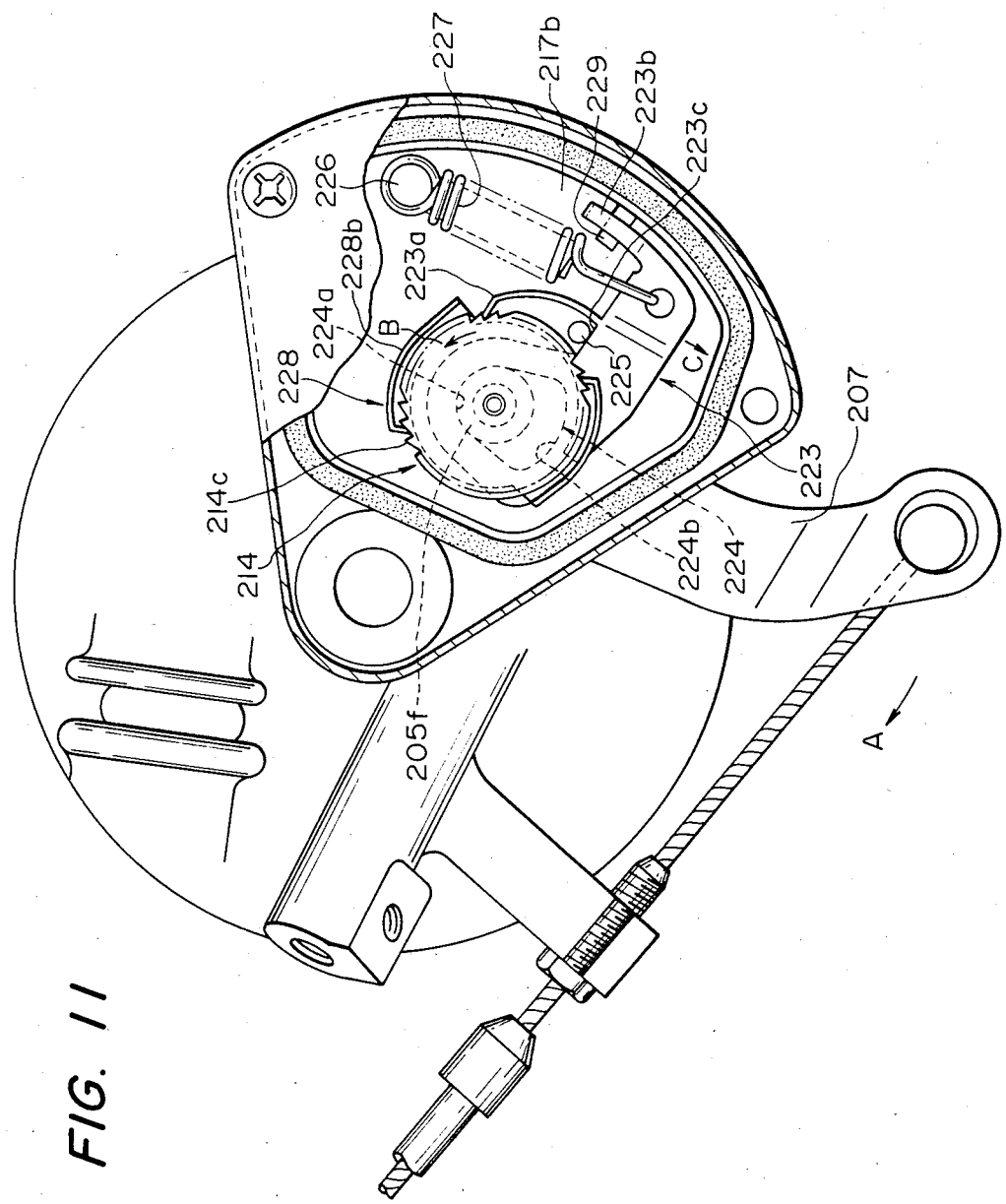
FIGS. 11 to 13 inclusive show a further embodiment of the present invention, FIG. 11 being a rear view.

The pawl portion 223a of the stopper lever 223 mates at its end with the tooth 214c of the adjusting gear 214 in such a manner that, when a brake arm 207 is pulled in the actuation direction indicated by A in FIG. 11, the adjusting gear 214 is turnable in the actuation direction of the cam member. In this state, the pawl portion 223b of the stopper lever 223 is located on the wall 217b of the casing 217, as shown in FIG. 12, and the side 223c thereof takes abutment onto the support pin 225, as shown by a solid line.

An adjusting lever 228 is fitted over the aforesaid shank portion 205f, so that it is turnable in unison with the cam member 205, and has a resilient pawl portion 228b to be in engagement with the tooth 214c of the adjusting gear 214.

The third embodiment as described above operates as follows.

When the braking gap increases due to abrasion, adjustment thereof takes place. In this state, the pawl portion 223b of the stopper lever 223 is positioned on the wall 217b of the casing, as shown in FIG. 12, and the stopper lever 223 takes abutment onto the pin 225. In this way, the arcuate section 224a of the opening 224 slidingly abuts against the shank portion 205f.

After full-adjustment, since the stopper lever abuts at its end against the adjusting gear 214, it does not proceed any more so that the cam member 205, the adjusting lever 228, the adjusting gear 214 and the stopper lever turn together in the actuation direction of the cam member 205. Thereby, the stopper lever 223 turns around the shank portion 205f in the actuation direction indicated by an arrow C against the action of the spring 227, while it continues to engage the tooth 214c of the adjusting gear 213, leading to no adjustment. As a result, there is an increase in the stroke of the brake lever or pedal, which is a sign that the brake shoes need replacement.

When an overload is applied to the brake arm 207 to such an extent that there is a change in the rigidity of the drum during adjustment, the stopper lever 223 moves simultaneously with the adjusting gear 214 in the counter-actuation direction of the cam member 205 against the action of the spring 227, so that, since the engagement of the adjusting gear 214 with the adjusting lever 223 is maintained, adjustment is interrupted to avoid any over-adjustment.

It is noted that the rotation of the adjusting gear 214 increases in proportion to the amount of abrasion. When the amount of abrasion reaches a given value, the pawl portion 223b of the stopper lever 223 fits into a recess 229 formed in the casing face 217b.

Figure 12:
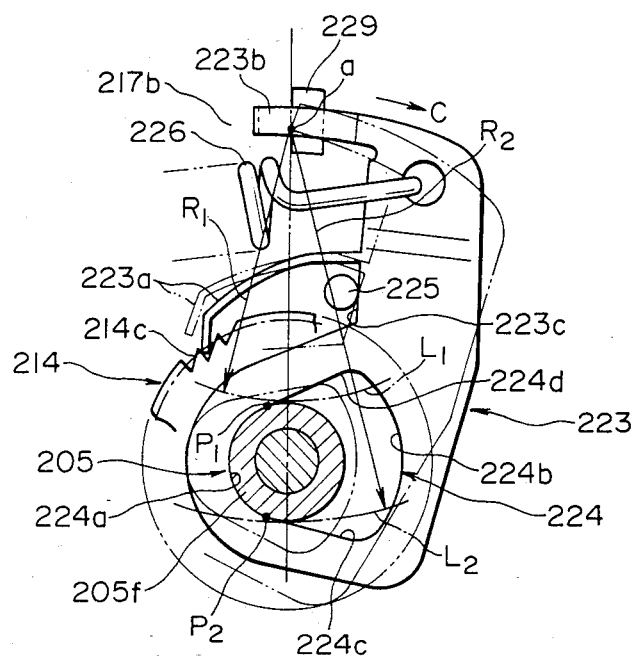
Figure 13:
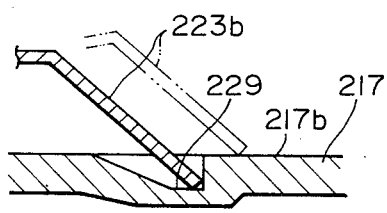

Release of the brake arm 207 causes a return force to act upon the adjusting gear, with the result that the space 224 of the adjusting lever 223 is guided along shank portion 205f, and turns around the end point of the pawl portion 223b, and is positioned in place, as shown in phantom in FIG. 12. Even when the brake arm 207 returns to the original position, the stopper lever 223 does not return to the original position, but is held in another position, so that the former disengages the latter. Thus, any failure or breakage of the pawl portion 223a of the stopper lever 223 takes place, since there is no fear of being overloaded.

According to the third embodiment as described above, after full-adjustment whereby the stopper lever is adjusted with respect to the shank portion of the cam member, the lever is designed to turn around the shank portion of the cam member in the actuation direction thereof, while it continues to mate with the adjusting gear. When the amount of turning of the lever exceeds a given value, the lever is guided into the essentially sector-shaped space where it turns. It is thus possible to disengage the adjusting gear out of the stopper lever in a simple and sure manner. Therefore, it is possible to effectively prevent the stopper lever from failing or breaking, since there is no fear that it may be overloaded.

Furthermore, it is possible to eliminate any error in the engagement of the pawl portion of the stopper lever with the tooth of the adjusting gear by allowing the arcuate section of the opening therein to abut against the outside of the cam shaft. This results in sure adjustment of the braking gap.

What is claimed is:

1. An automatic braking-gap adjuster system for mechanical drum brakes, including a back plate, a pair of brake shoes each having one end pivotally supported on the back plate, an elongated cam member interposed between the other end of the brake shoes and adapted to be rotated about an axis by a brake arm in an actuation direction, said cam member having an axial tapered groove therein, a cam collar axially slidingly fitted into said groove and abutting onto the other end of said brake shoes, an adjusting bolt axially and threadedly inserted into said cam member with the head of said bolt bearing against the end of said cam collar, an adjusting gear disposed to be rotatable with said adjusting bolt, an adjusting lever fixed at one end thereof to said cam member to rotate therewith and having a resilient pawl portion at the other end thereof to engage with said adjusting gear at a first position, a fixed support pin extending parallel to the rotation axis of said cam member, a stopper lever supported at one end portion thereof on said support pin to be movable in the actuation direction of said cam member and a pawl portion at a location remote from said one end portion and engaging said adjusting gear in such a manner that said gear is restrained from turning in the actuation direction of said cam member, and a spring member to bias said stopper lever in the counter-actuation direction of said cam member, whereby when the abrasion of brake linings mounted on said shoes reaches a predetermined value, said adjusting lever engages with said adjusting gear at another position and said cam member rotates relative to said adjusting bolt thereby causing said cam collar to move outwardly against said shoes.

2. An automatic braking gap adjustor system as claimed is claim 1, in which said stopper lever includes a pivotal end having therein an opening of a given shape to receive said support pin, and in which said stopper lever is slidable over fixed stopper means, whereby, when the amount of movement of said stopper lever in the actuation direction of said cam member reaches a predetermined value, said stopper lever is held in another place by said stopper means to disengage said stopper lever out of said adjusting gear.

3. An automatic braking gap adjustor system as claimed in claim 2, wherein said opening of a given shape is essentially triangular.

4. An automatic braking gap adjustor system as claimed in claim 1, wherein said stopper lever has an arcuate slot at said one end and is slidingly supported, by means of said slot, on said support pin, and said pawl portion is located at the other end of said stopper lever.

5. An automatic braking-gap adjuster system for mechanical drum brakes, including a back plate, a pair of brake shoes each having one end pivotally supported on the back plate, an elongated cam member interposed between the other end of the brake shoes and adapted to be rotated by a brake arm in an actuation direction, said cam member having an axial tapered groove therein, a cam collar axially slidingly fitted into said groove and abutting onto the other end of said brake shoes, an adjusting bolt axially and threadedly inserted into said cam member with the head of said bolt bearing against the end of said cam collar, an adjusting gear disposed to be rotatable with said adjusting bolt, an adjusting lever fixed at one end thereof to said cam member to rotate therewith and having a resilient pawl portion at the other end thereof to engage with said adjusting gear at a first position, a fixed support pin extending parallel to the axis of said cam member, a stopper lever having an essentially sector-shaped opening at one end portion thereof slidingly fitted over said cam member, a first pawl portion at the other end of said stopper lever to engage fixed locking means when the amount of movement of said stopper lever reaches a predetermined value, an arm extending from said stopper lever at a location intermediate the ends, and a second pawl portion at the end of said arm to engage said adjusting gear, said stopper lever bearing against said support pin for pivotal movement thereagainst, and a spring member to bias said stopper lever in the counter-actuation direction of said cam member, whereby when said first pawl means engages said locking means, said stopper lever pivots about said support pin and said opening slides along said cam member to thereby cause said second pawl portion to disengage said adjusting gear.

* * * * *